United States Patent
Sung et al.

(10) Patent No.: US 8,588,190 B2
(45) Date of Patent: Nov. 19, 2013

(54) MULTIPLE ACCESS DIGITAL COMMUNICATING METHOD IN ULTRA-WIDEBAND RADIO ACCESS NETWORKS

(75) Inventors: Dan Keun Sung, Daejeon-si (KR); Bang Chul Jung, Seoul (KR); Ho Young Hwang, Seoul (KR); Chang Yong Jung, Cheongiu-si (KR); Young Jun Hong, Seoul (KR); Jo Woon Chong, Seoul (KR)

(73) Assignee: Pantech Co., Ltd., Seoul (KR)

( * ) Notice: Subject to any disclaimer, the term of this patent is extended or adjusted under 35 U.S.C. 154(b) by 1631 days.

(21) Appl. No.: 11/910,143

(22) PCT Filed: Mar. 28, 2006

(86) PCT No.: PCT/KR2006/001129
§ 371 (c)(1),
(2), (4) Date: Sep. 28, 2007

(87) PCT Pub. No.: WO2006/109934
PCT Pub. Date: Oct. 19, 2006

(65) Prior Publication Data
US 2008/0165746 A1 Jul. 10, 2008

(30) Foreign Application Priority Data
Mar. 28, 2005 (KR) .................. 10-2005-0025568

(51) Int. Cl.
*H04J 3/00* (2006.01)
(52) U.S. Cl.
USPC .......................................... 370/337; 370/468
(58) Field of Classification Search
USPC ................................................. 370/337, 468
See application file for complete search history.

(56) References Cited

U.S. PATENT DOCUMENTS 6,041,046 A  3/2000 Scott et al.
6,807,160 B1 10/2004 Laroia et al.
(Continued)

FOREIGN PATENT DOCUMENTS

JP  59-183538   10/1984
JP  6-029899    2/1994
(Continued)

OTHER PUBLICATIONS

Amir R. Forouzan, et al., Performance Analysis of Time-Hopping Spread-Spectrum Multiple-Access Systems: Uncoded and Coded Schemes, IEEE Transactions on Wireless Communications, Oct. 2002, pp. 671-681, vol. 1, No. 4, IEEE.

(Continued)

*Primary Examiner* — Sai-Ming Chan
(74) *Attorney, Agent, or Firm* — H.C. Park & Associates, PLC

(57) ABSTRACT

A multiple access digital communication method in ultra-wideband (UWB) radio access network is provided. More specifically, a multiple access technique in UWB communication channels is provided where UWB communication channels can be more efficiently used and collisions between multiple access user nodes can be more effectively avoided when the channels have a great multiple path fading. The digital communication method for use in an uplink in a UWB communication system includes the steps of: receiving data symbols from respective nodes, in which the data symbols are transmitted according to respective orthogonal time hopping patterns; checking whether there is a collision of the orthogonal time hopping patterns; and decoding the data symbols depending on whether data symbols of nodes involved in the collision of the orthogonal time hopping patterns are the same.

16 Claims, 20 Drawing Sheets

(56) References Cited

U.S. PATENT DOCUMENTS

| | | | |
|---|---|---|---|
| 2001/0038620 A1 | 11/2001 | Stanwood et al. | |
| 2002/0191569 A1* | 12/2002 | Sung et al. | 370/335 |
| 2003/0086482 A1* | 5/2003 | Shimizu et al. | 375/147 |
| 2004/0001429 A1* | 1/2004 | Ma et al. | 370/210 |
| 2004/0008617 A1 | 1/2004 | Dabak et al. | |
| 2004/0057500 A1* | 3/2004 | Balachandran et al. | 375/138 |
| 2004/0240527 A1* | 12/2004 | Giannakis et al. | 375/138 |
| 2004/0240565 A1 | 12/2004 | Santhoff et al. | |
| 2004/0264403 A1* | 12/2004 | Fette et al. | 370/328 |
| 2005/0013387 A1* | 1/2005 | Ojard | 375/316 |
| 2005/0197079 A1* | 9/2005 | Banister et al. | 455/135 |
| 2005/0238084 A1* | 10/2005 | Kuperschmidt et al. | 375/133 |
| 2005/0254554 A1* | 11/2005 | Melick et al. | 375/130 |
| 2006/0020433 A1* | 1/2006 | Taha et al. | 703/2 |
| 2006/0045053 A1* | 3/2006 | Erlich et al. | 370/338 |
| 2006/0140215 A1* | 6/2006 | Fleming | 370/468 |
| 2008/0279123 A1* | 11/2008 | Struhsaker et al. | 370/280 |

FOREIGN PATENT DOCUMENTS

| | | |
|---|---|---|
| JP | 07-254867 | 3/1995 |
| JP | 09-064884 | 7/1997 |
| JP | 10-065646 | 3/1998 |
| JP | 10-163910 | 6/1998 |
| JP | 2002-271428 | 9/2002 |
| JP | 2003-110571 | 4/2003 |
| JP | 2004-085545 | 3/2004 |
| JP | 2004-179802 | 6/2004 |
| JP | 2004-328498 | 11/2004 |
| JP | 2004-357061 | 12/2004 |
| JP | 2005-020350 | 1/2005 |
| WO | 01/11897 A2 | 2/2001 |
| WO | 2005/025135 | 3/2005 |

OTHER PUBLICATIONS

Chang Yong Jung, et al., Orthogonal Time Hopping Multiple Access for UWB Impulse Radio Communications, Asia-Pacific Conference on Communications, Oct. 3-5, 2005, pp. 353-357, Perth, Western Australia.

Extended European Search Report for EP 06 73 2719 dated Apr. 5, 2013.

* cited by examiner

MULTIPLE ACCESS DIGITAL COMMUNICATING METHOD IN ULTRA-WIDEBAND RADIO ACCESS NETWORKS

TECHNICAL FIELD

The present invention generally relates to a multiple access digital communicating method in ultra-wideband (hereinafter, referred to as "UWB") radio access networks. More specifically, the present invention relates to a multiple access technique by which UWB communication channels can be more efficiently used and collisions between multiple access user nodes can be more effectively controlled under the circumstances where the channels experience large multiple path fadings.

BACKGROUND OF THE INVENTION

Multiple access schemes in a conventional UWB communication system include Time Division Multiple Access (TDMA) for allocating time slots or time resources to calls by a management node, Carrier Sense Multiple Access/Collision Avoidance (CSMA/CA) for attempting to make an access after finding out that a shared channel is available, Time Hopping Multiple Access (THMA), Code Division Multiple Access (CDMA), and so on. However, since these techniques had already been used broadly before a UWB communication technique were developed, they should be modified or improved properly in accordance with the recent physical layer technique.

TDMA is a technology that allows multiple accesses, in which a management node inquires of each node whether to transmit data and assigns a specific orthogonal time slot to a node that requests data transmission. Even though TDMA is useful for efficiently managing the service quality of each node, it is difficult and highly complex for a management node to manage all nodes every second for the operation of networks. Unfortunately, the complexity is sharply increased as the number of nodes increases.

CSMA/CS is a network control technology for sharing a channel in which a carrier sensing scheme is used to find out whether another node uses the channel before attempting to transmit data. When an ACK (acknowledgement) is not received or when more than one node uses the shared channel at the same time, a collision is announced and communication is tried again after a specific amount of time. Even though CSMA/CS can have a very simple embodiment, it has a difficulty in sensing whether the shared channel is being used particularly when the UWB signal power is very low and the effects of multiple paths fading are great. When the reliability on the detection possibility of channel usage is lowered, the performance of CSMA/CA is substantially deteriorated. In order to get high reliability, sensing needs to be done for an extended amount of time but this indicates the efficiency becomes low. Moreover, in case of CSMA/CA, when the number of nodes is greater than a certain level, the success probability of multiple access is lowered noticeably.

Recently developed multiple access schemes include THMA and CDMA. These schemes are robust against interference by averaging multiple user interference, and have excellent frequency domain properties of UWB signals. Nevertheless, when the distance from a management node to each node differs, they generate "near-far" effects and the amount of interference increases when the number of nodes becomes greater than a given level so that all nodes may not be able to communicate with each other. This problem occurs because signals of plural nodes accessing to the management node are not orthogonal to each other. In case of conventional multiple access schemes, it was impossible to use orthogonal codes because node signals were not synchronized with respect to the reception time of the management node.

FIG. 1 shows an operation of an asynchronous uplink in a conventional system. When the distances from a management node 305 to nodes are different, data transfer times 310, 315 and 320 from the nodes to the management node are also different. In addition, although the nodes transmit data at the same time, the management node receives the data at different times. Attempting to communicate using orthogonal time resources under this circumstance only causes interference to another node in the communication area. Therefore, instead of using orthogonal time resources, a pseudo noise (PN) code which is a resource of a low correlation may be used (DS-CDMA or THMA), or a shared channel may be checked and used (CSMA-CA), or a random channel may be used (ALOHA).

However, interference still exists in communications even if a PN code is used despite its low correlation. Such interference may cause a very serious problem to a system without power control. In case of CSMA in which a node verifies the absence of other traffic before transmitting on a shared channel, communication cannot be made unless the shared channel is absolutely clear or no other traffic is present. This corresponds to a case where multiple path fading is bad or a case having the problem of "Hidden node/Exposed node". Lastly, using a random channel, such as in ALOHA, is not very efficient since the success probability of communication is noticeably lowered as the number of nodes increases.

Meanwhile, the frame structure for use in the access scheme in conventional UWB communication systems is a super-frame composed of an active period and an inactive period. The active period in which nodes are activated for communications consists of a beacon period, a contention access period, and a contention free period. On the other hand, in the inactive period all nodes of a network including a network coordinator are inactivated. In the contention free period, TDMA-based technology is used for a management node to operate the network, so it is difficult and highly complex for the management node to manage all nodes every second. In the contention access period, however, a CSMA/CA based technology is used, so it is difficult to sense the traffic on a shared channel when the power of a UWB signal is very low and the effects of multiple path fading are great. Especially, as the number of nodes increases, complexity of TDMA scheme in the contention free period increases sharply and the success probability of multiple access of CSMA/CA scheme in the contention access period is noticeably lowered. In consequence, the performance of the entire communication system is deteriorated.

DETAILED DESCRIPTION OF THE PREFERRED EMBODIMENTS

Technical Subject

Various embodiments of the present invention are directed at providing a multiple access digital communicating method in ultra-wideband (UWB) radio access networks, by providing a very efficient frame structure for UWB communication systems characterized by an effective radio access technology, low power consumption and high efficiency.

The multiple access digital communicating method according to the present invention is a radio access scheme that highly utilizes the effect of statistical multiplexing in an uplink which is not found in conventional systems for a UWB communication system where the effect of multiple path is great. According to the present invention, in a communication system where a specific management node manages nodes with low channel activity, each node attempts to communicate by using an orthogonal time hopping pattern that is pre-assigned at a certain time, and the management node distinguishes the respective nodes through their hopping patterns. In this manner, the effect of statistical multiplexing is realized, and simplified operating is achieved since a complex control signal system for managing communication channels is not required. The present invention resolves problems found in UWB communication systems using conventional access technologies, i.e., difficulties in sensing available channels due to the effects of multiple paths and the increased complexity of system operation when a specific management node is to manage plural user nodes. Moreover, the radio access scheme of the invention is operated with a very effective, adaptive frame structure featuring low power consumption and high efficiency, through which power-saving periods are assigned to user nodes in consideration of their battery power consumption, a mixed mode of orthogonal time hopping system and orthogonal time division system is used for communications in an active period which is not a power-saving period, and conversion to different multiple access methods is possible.

By allowing user nodes to be synchronized with the reception time of the management node and to attempt to make an access by hopping orthogonal time, the present invention takes advantage of the properties of orthogonal time resources in an uplink, and statistically multiplexes traffics with low activity or variable transmission data rate through the orthogonal time hopping multiplexing scheme. Therefore, performance improvement of the UWB communication system is achieved by making the management node accommodate more nodes to its channel, increasing the usage of limited orthogonal resources, decreasing control signal traffics for allocating and returning unnecessary channels, relieving the transmission scheduling complexity of an uplink, reducing the buffer capacity required by a node, reducing the data transmission delay time and so on.

Additional advantages, objects, and features of the invention will be set forth in part in the description which follows and in part will become apparent to those having ordinary skill in the art upon examination of the following or may be learned from practice of the invention.

Technical Solution

According to one embodiment of the present invention, a digital communication method in an uplink of a UWB communication system includes: keeping time synchronization from respective user nodes with a management node; and hopping available time slots for communication, according to orthogonal time hopping patterns assigned by the management node. The time synchronization step includes sub-steps of: calculating the time difference between the generation of a time synchronization signal at the management node and the arrival of the synchronizing signal at the user node; and adjusting the data transmission time to the management node according to the time difference.

According to one embodiment of the present invention, a digital communication method in an uplink of a UWB communication system includes: summing the energies of the received signals at time slots which are assigned to the respective user nodes through orthogonal time hopping patterns; comparing the summed energy with a predetermined threshold value; and when the summed energy is greater than the threshold value, judging that the user node has transmitted data.

According to one embodiment of the present invention, a digital communication method in an uplink of a UWB communication system includes: classifying user nodes into at least two groups; and setting active periods by groups in a manner that the active periods are not overlapped with each other.

According to one embodiment of the present invention, a digital communication method in an uplink of a UWB communication system includes: receiving data symbols from respective nodes, in which the data symbols are transmitted according to respective orthogonal time hopping patterns; checking whether there is a collision of the orthogonal time hopping patterns; and decoding the data symbols depending on whether data symbols of nodes involved in the collision of the orthogonal time hopping patterns are the same.

According to one embodiment of the present invention, a frame structure for a UWB communication system is capable of efficiently accommodating users with diverse service requests on a network and ensuring good service quality to the respective users, and reduces power consumption of user nodes. The present invention introduces an adaptive communication method, through which power-saving periods are assigned to user nodes in consideration of their battery power consumption, a mixed mode of orthogonal time hopping system and orthogonal time division system is used for communications in an active period which is not a power-saving period, and conversion to different multiple access methods is possible. The present invention also suggests two additional communication methods, in which user nodes are classified into at least one group and the orthogonal time hopping method and the orthogonal time division method are combined and used in the respective groups, and in which the orthogonal time hopping method is used in the respective groups while the orthogonal time division method is used for the entire group.

PREFERRED EMBODIMENTS

The present invention will be explained with reference to the accompanying drawings.

Configuration and Functions of Orthogonal Time Hopping Multiple Access (OTHMA)

OTHMA is a multiple access scheme used in uplink environment of a UWB communication system, in which each node adjusts its signal transmission time so that a management node can receive signals from the respective nodes at the same time, and the nodes hop time slots for communication according to orthogonal time hopping patterns assigned by the management node. That is, OTHMA is a multiple access method capable of processing the respective node signals which are received synchronously by the management node, and of handling possible collisions between signals.

Figure 1:
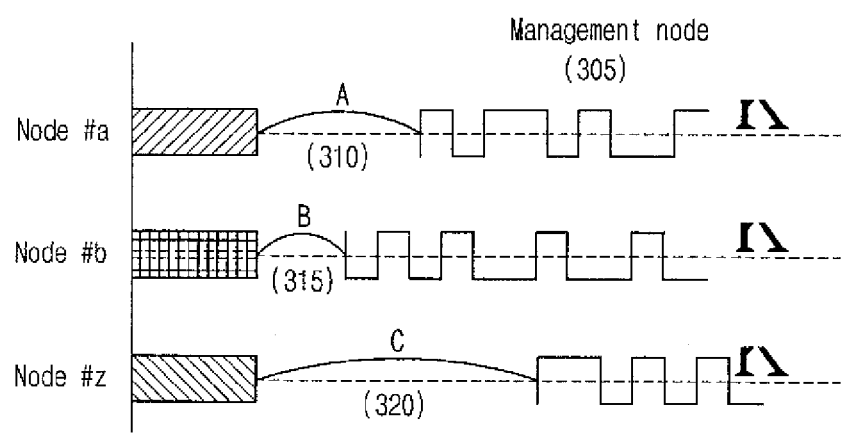
FIG. 1 is a diagram illustrating an unsynchronized uplink in a conventional system.
Figure 2:
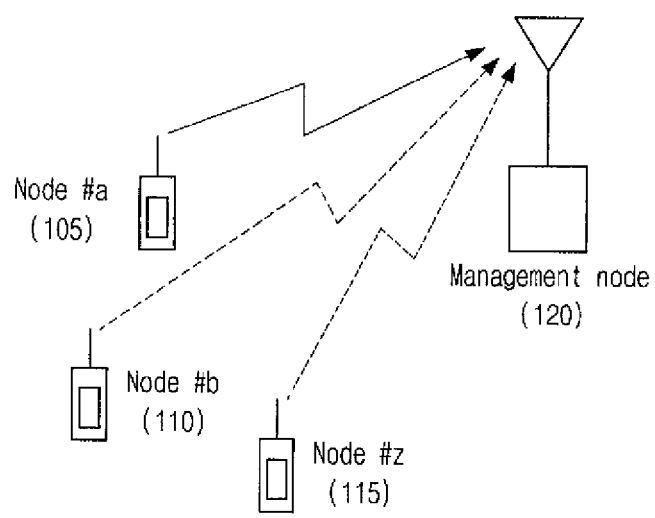
FIG. 2 shows a management node based network structure according to an embodiment of the present invention.

FIG. 2 shows a management node based network structure to which the present invention is applied. The respective nodes 105, 110 and 115 transmit and receive data with a management node 120. Since the distance between each node and the management node differs, although the nodes may send data at the same time, the management node receives the data at different times. In order to implement OTHMA of the invention, the management node must receive data from all the nodes concurrently. To this end, the respective nodes calculate time difference between the generation of a periodic ranging (synchronization) signal by the management node and the arrival of the synchronization signal, and adjust the transmission time to make their signals arrive at the management node synchronously with the reference time of the management node. Through this procedure, signals of the respective nodes are sent to the management node at the same time.

Figure 3:
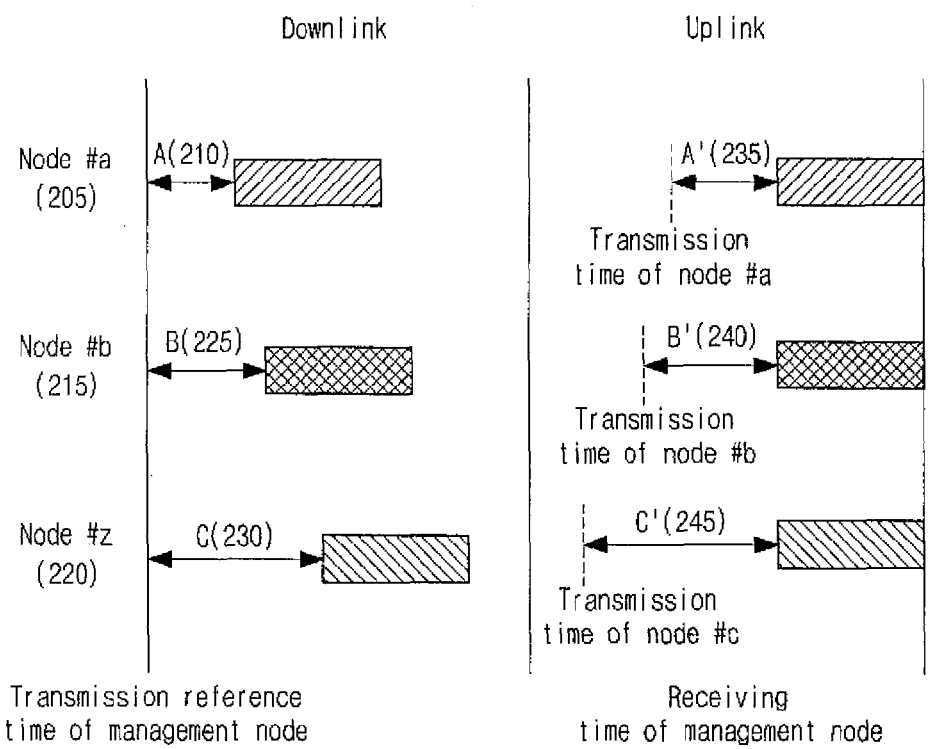
FIG. 3 is a diagram illustrating a synchronization process of an uplink from a node to a management node according to an embodiment of the present invention.

FIG. 3 illustrates the synchronization process. As shown in FIG. 3, node a 205 receives a signal from the management node after A 210 amount of time, and node b 215 and node z 220 receive a signal from the management node after B 225 and C 230 amounts of time, respectively. The respective nodes store the time, and transmit data 235, 240 and 245 to an uplink earlier than the reference time by these amounts of time. In this way, signals from the nodes are received by the management node at the same time as depicted in FIG. 3. Such uplink is called a synchronized uplink.

Figure 4:
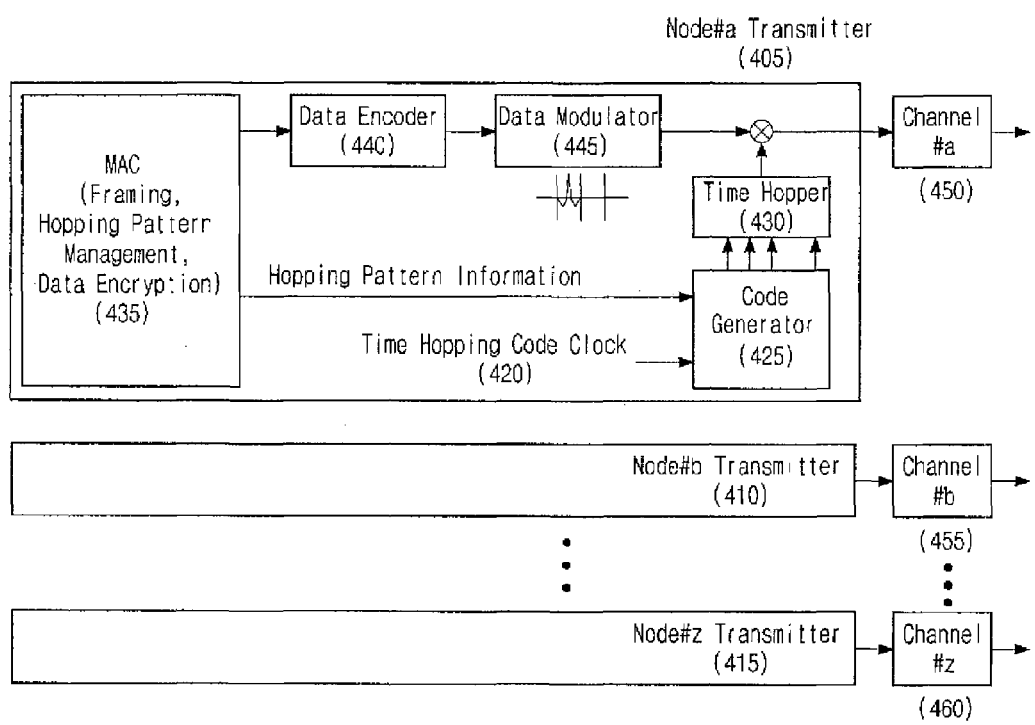
FIG. 4 shows a structure of the transmitter of a node in an uplink from the node to a management node according to an embodiment of the present invention.
Figure 5:
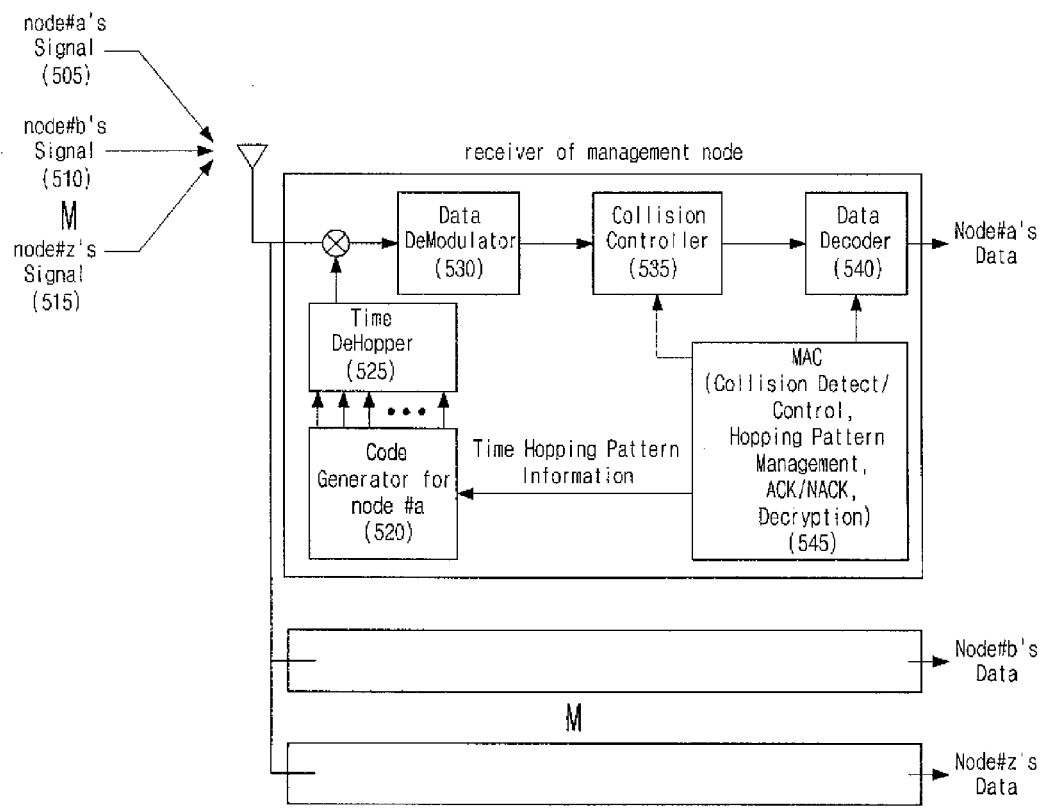
FIG. 5 shows a structure of the receiver of a management node in an uplink from a node to the management node according to an embodiment of the present invention.

FIG. 4 shows the structure of a transmitter of nodes used in the present invention. Each of the transmitters 405, 410 and 415 includes a code generator 425, a time hopper 430, a MAC layer 435, a data encoder 440 and a data modulator 445. As described with reference to FIG. 3, each node synchronizes transmission time of a data symbol to be sent to the management node. After synchronization, when there is data to be sent, the MAC layer 435 generates a transmitting frame, checks an assigned orthogonal time hopping pattern, and encrypts data symbols to be sent, if necessary. Moreover, the MAC layer 435 transfers information on an orthogonal time hopping pattern cycle to be used and its generation to the code generator 425. Then, the code generator 425 generates orthogonal time hopping patterns for the respective nodes by using the information provided by the MAC layer 435 and a Time Hopping Code Clock Signal 420. The node data generated in the MAC layer are encoded by the data encoder 440, and modulated by the data modulator 445 through BPPM (Binary Pulse Position Modulation), BPSK (Binary Phase Shift Keying), etc. The modulated data symbols are assigned to corresponding time slots by the time hopper 430 according to the orthogonal time hopping patterns that are generated by the code generator 425. The data symbols assigned to specific time slots are transmitted through radio channels 450, 455 and 460 between the respective nodes and the management node. FIG. 5 shows the structure of a receiver of the management node used in the present invention. As described above, the nodes adjust their data transmission time to help the management node receive the data concurrently. In other words, data from each node 505, 510 and 515 are received synchronously by the management node.

Signals of the respective nodes are multiplexed in orthogonal time slots and received by the management node. A MAC layer 545 transmits information about orthogonal time hopping patterns of the respective nodes to a code generator 520. The code generator 520 generates orthogonal time hopping patterns for the respective nodes by using the information provided by the MAC layer 545. A time dehopper 525 receives data at time slots corresponding to the orthogonal time hopping patterns that are generated by the code generator 520. Thus, received signals are then demodulated by a data demodulator 530.

The MAC layer 545 can find out which nodes cause a collision at which time slot. The management node has orthogonal time hopping patterns of the respective nodes. Therefore, by learning whether each of the nodes sends data, the management node is able to find out which nodes cause a collision together at which orthogonal time. There are two ways for the management node to find out whether the respective nodes sent data.

One method is that the respective nodes first inform the management node about their data transmission by using a control signal previously to data transmission. According to the other method, when the respective nodes transmit data without using a specific control signal, the management node sums energies of signals that are received at time slots assigned to the nodes through their orthogonal time hopping patterns, compares the summed energy with a predetermined threshold value to decide whether a node has transmitted data. The method for finding out whether a node has transmitted data will be explained in more detail at later time in connection with the frame structure.

A collision controller 535 receives from the MAC layer 545 the information about a time slot where a collision occurred, and based on this information it executes a collision control on a signal received after the collision. After passing through the collision controller 535, the signal is decoded by a data decoder 540.

Figure 6:
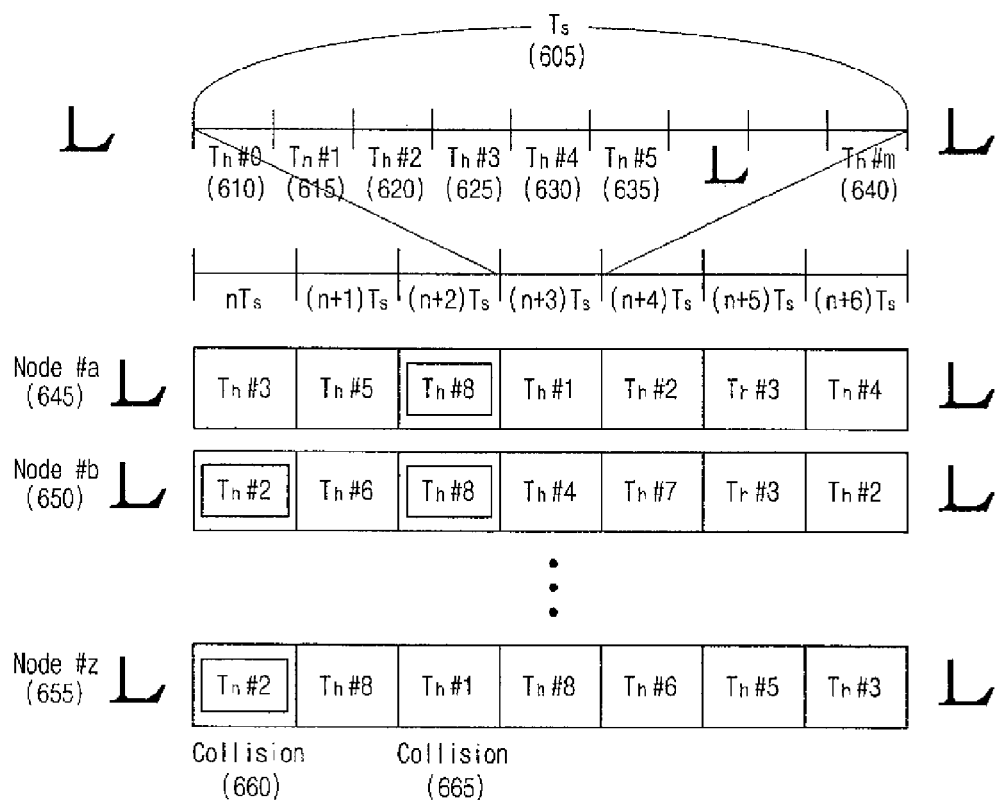
FIG. 6 shows the configuration of a system for allocating and operating hopping patterns of respective nodes.

FIG. 6 illustrates how a node hops an orthogonal time slot. For data transmission, a node hops m orthogonal time slots 610-640 separated at a time base during one symbol time 605. As shown in the drawing, in case of node #a 645, it transmits data using an orthogonal time slot #3 in the n-th symbol, and transmits data using an orthogonal time slot #5 in the (n+1)-th symbol. Likewise, other nodes transmit data by hopping time slots orthogonal to each symbol. Here, since hopping patterns of the nodes are random and independent, collisions with other nodes may occur. For example, in FIG. 6, node #b and node #z use the same orthogonal slot #2 in the n-th symbol period. This is a collision between two nodes 660. This type of collision between orthogonal time hopping patterns should be properly controlled at a receiving end. It is not the fixed and specific orthogonal time slot but an orthogonal time slot assigned according to the orthogonal time hopping pattern each node uses for communication. The management node decodes data from the respective nodes through their assigned hopping patterns.

The probability of collisions of orthogonal time hopping patterns between nodes is expressed as follows:

$$P_C = 1 - \left(1 - \frac{\bar{v}}{N_{OT}}\right)^{K-1} \quad \text{[Equation 1]}$$

Here, NOT indicates the total number of orthogonal time slots, K indicates the number of nodes with the assigned orthogonal time hopping patterns to open communication sessions, and $\bar{v}$ indicates the average of channel activities of the respective nodes. Equation 1 is obtained based on an assumption that each node uses one orthogonal time among the total orthogonal time to attempt a communication. As known through the equation, the collision probability increases as the number of nodes and channel activity of the respective nodes increase. FIG. 6 shows that the respective nodes are all activated. However, even though the same orthogonal time is assigned to the respective nodes in the same symbol period, when the nodes are not activated, they do not interfere with one another. Considering the data traffic property of substantially low channel activity, the collision probability is not very high. When this orthogonal time hopping access method is used for communication, the respective nodes may attempt communications every time they have data without specific control signals, and the management node can decode signals from the nodes by using their orthogonal time hopping patterns only. At this time, 1 bit control information which tells whether a node transmitted data may be added in order to reduce the complexity of receiving data on the management node.

When orthogonal time hopping patterns collide, the management node may conclude that it has not received the signal transmitted at the time slot with the occurrence of such collision. However, it also may check whether the collided data symbols are the same and if so, use the data symbol for the acquisition of information.

When it is decided that the nodes causing collisions of orthogonal time hopping patterns have the same symbols, the received data symbol is applied as it is to the decoder for decoding the symbol of each node. This is because although there has been a collision of hopping patterns, it renders a positive influence on decoding. However, when more than one of the data symbols of collided nodes are not the same, the received data symbols are not applied directly to the decoder, but their neutralized value is applied to the decoder for decoding symbols from the respective nodes. To give neither positive nor negative influence on any node, a neutral signal is compulsively announced in symbol periods of all the nodes that caused collisions so that any signals received at the time slots with the occurrence of a collision are not regarded as being received.

The control methods of collisions for decoding especially when orthogonal time hopping patterns of the respective nodes are collided may be different by modulation methods.

Figure 7:
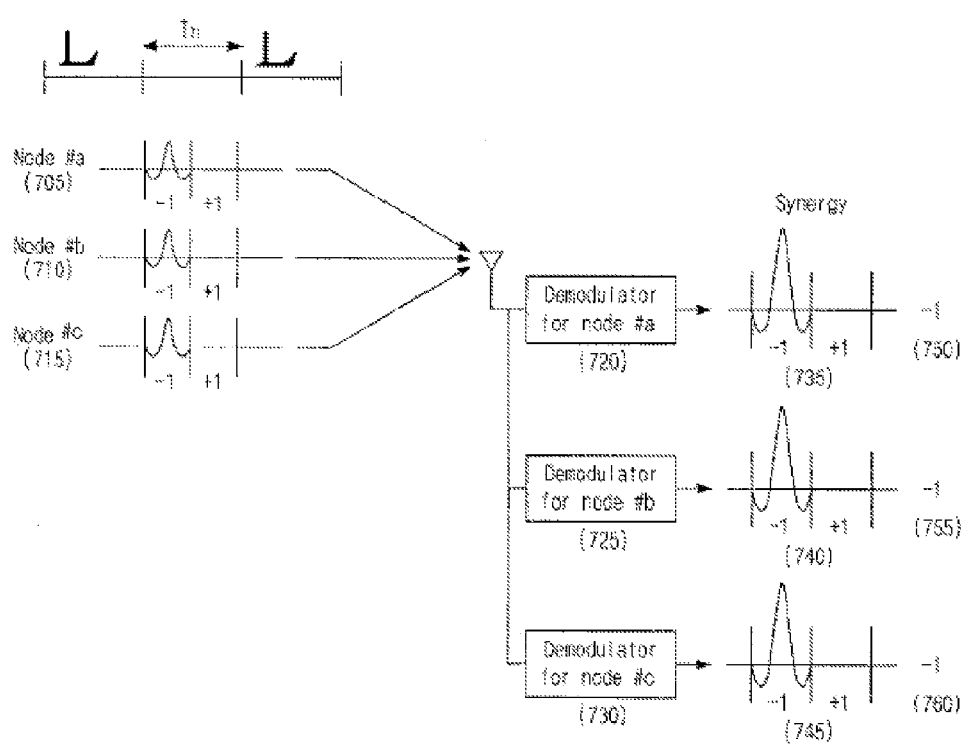
FIG. 7 is a diagram illustrating a method for controlling collisions of hopping patterns in respective nodes with BPPM modulation in case that all the collided symbols are the same.

FIG. 7 shows a method for controlling collisions of hopping patterns in respective nodes with BPPM modulation in case that all data of collided symbols are the same.

In FIG. 7, nodes a, b and c 705, 710 and 715 transmit data symbols using the same time slot. Since the management node knows hopping patterns of the respective nodes and which nodes have transmitted data symbols, it becomes aware which nodes occupy a specific orthogonal time slot. In FIG. 7, for example, the respective nodes a, b and c transmit data at the same pulse position, i.e., the pulse position corresponding to −1. In this case, the demodulators 720, 725 and 730 of the management node measure pulse energies at the respective pulse positions within the time slot with the occurrence of a collision. In other words, the demodulators measure pulse energy at the left side pulse position corresponding to −1, and pulse energy at the right side pulse position corresponding to +1. Suppose that a large pulse energy value is A and a small pulse energy value is B. Since A/B is greater than a predetermined threshold value, the management node judges that the data symbols exist at only one position 735, 740 and 745, and presumes that information of the nodes occupying a specific orthogonal time are the same. Here, the predetermined threshold value varies depending on the number of nodes causing collisions and the distance between a node and the management node. In FIG. 7, the left side pulse energy is large while the right side pulse energy is as small as noise level, so the management node presumes that all the data symbols have −1 despite the collisions of the orthogonal time hopping patterns. Since this is the case that all the nodes that caused collisions of orthogonal time hopping patterns have the same symbol, the received data symbols are inputted as they are to the decoder for decoding symbols of the respective nodes. Namely, the value '−1' is applied to the decoder 750, 755 and 760.

Figure 8:
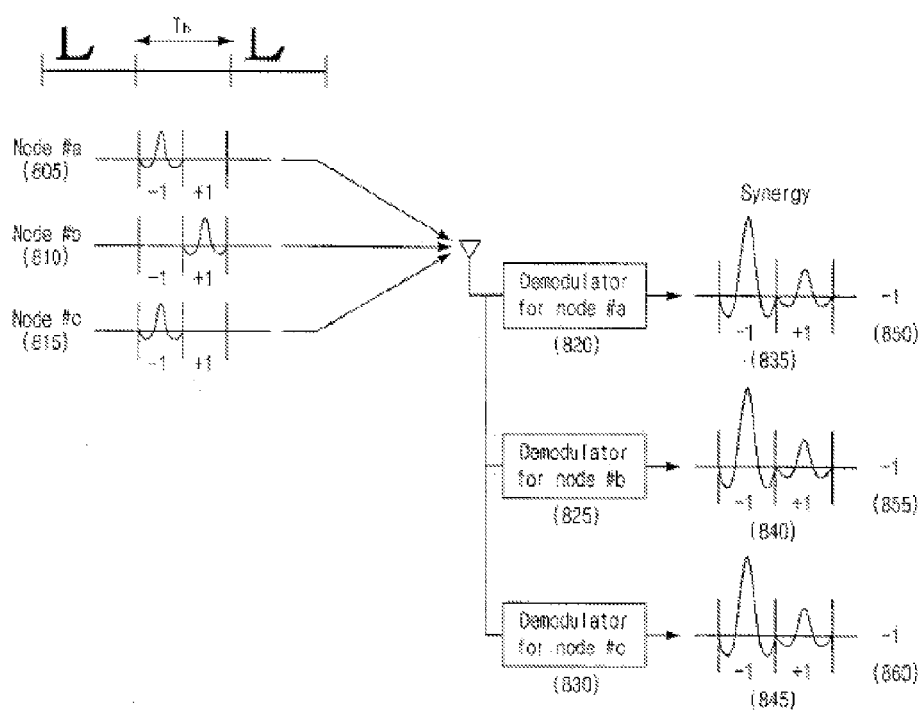
FIG. 8 is a diagram illustrating a method for controlling collisions of hopping patterns in respective nodes with BPPM modulation in case that all the collided symbols are not the same.

FIG. 8 illustrates a method for controlling collisions of hopping patterns in respective nodes with BPPM modulation in case that all data of collided symbols are not the same.

In FIG. 8, nodes a, b and c 805, 810 and 815 transmit data symbols using the same time slot. Since the management node knows hopping patterns of the respective nodes and which nodes have transmitted data symbols, it becomes aware which nodes occupy a specific orthogonal time slot. In FIG. 8, for example, node a 805 transmits −1, node b 810 +1, and node c 815 −1, respectively. In this case, the demodulators 820, 825 and 830 of the management node measure pulse energies at the respective pulse positions within the time slot with the occurrence of a collision. In other words, the demodulators measure the pulse energy at the left side pulse position corresponding to −1, and the pulse energy at the right side pulse position corresponding to +1. Suppose that a large pulse energy value is A and a small pulse energy value is B. Since A/B is less than a predetermined threshold value, the management node judges that the data symbols exist at two positions 835, 840 and 845, and presumes that information of the nodes occupying a specific orthogonal time are different. FIG. 8 shows that the management node receives a mixed signal of two left side pulses and one right side pulse. This means that the right side pulse energy is not a negligible value compared to the left side pulse energy. Since this is the case that symbols of the nodes that caused collisions of orthogonal time hopping patterns are different with each other, a neutralized value, neither +1 nor −1 signal, is applied to the decoder for decoding data symbols of the respective nodes 850, 855 and 860.

Although FIGS. 7 and 8 illustrate methods for controlling collided data symbols by using pulse energy ratios at the respective pulse positions, the collided data symbols can be controlled by using the absolute values of pulse energies at the respective pulse positions. In case that the absolute value of a pulse energy at one pulse position is greater than a predetermined threshold value while the absolute value of a pulse energy at the other pulse position is less than the predetermined threshold value, the management node judges that symbols of all the nodes causing collisions of orthogonal time hopping patterns are the same. Thus, the received data symbols are applied to the decoder for decoding data symbols of the respective nodes. On the other hand, in case that the absolute values of pulse energies at the respective pulse positions are greater than the predetermined threshold value, the management node judges that symbols of the nodes causing collisions of orthogonal time hopping patterns are different from each other. Thus, a neutralized value, neither +1 nor −1 value, is applied to the decoder for decoding data symbols of the respective nodes.

Figure 9:
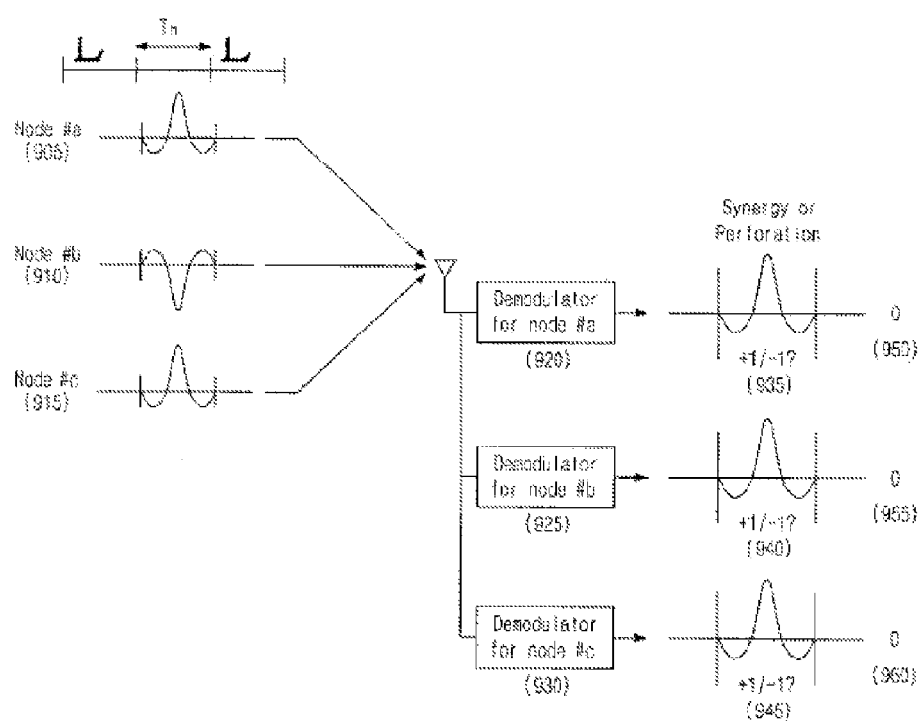
FIG. 9 is a diagram illustrating a method for controlling collisions in case that respective nodes use a BPSK modulation method.

FIG. 9 illustrates a method for controlling collisions in case that respective nodes use a BPSK modulation method. When the BPSK modulation method is used and more than two nodes transmit data symbols using the same orthogonal time slot, if it turns out that the nodes have transmitted the same data, the energy of received signal increases correspondingly to the increase in the number of nodes that caused collisions. For instance, suppose that three nodes transmitted +1 from the same distance. Then, the energy of received signals would be three times the energy of received signal at the absence of any collisions between nodes. Therefore, the management node sets a specific threshold value using the number of collided nodes and distance information of the respective nodes, and when it receives a signal having energy greater than the threshold value, it decides that all the nodes must have sent the same data and then inputs the received signal to the decoder without any particular control thereon. Meanwhile, when the received signal has energy less than the threshold value, the management node decides that there is a node among the collided nodes, which has a different data symbol from the others, so it inputs a neutralized value to the decoder.

FIG. 9 shows a case in which node a 905 transmits +1, node b 910 transmits −1, and node c 915 transmits +1, respectively. Since demodulators 920, 925 and 930 receive a summed signal of information from the nodes a, b and c, when the attenuation of radio waves by distances is ignored, a signal having a value of about 2 is received to time slots that caused collisions 935, 940 and 945. Provided that the threshold value is 2.5, since the sum of received signals is less than the threshold value, a neutralized value, i.e., 0, is applied to the decoder for decoding data symbols of the respective nodes 950, 955 and 960. In the case that distances from the management node to the respective nodes are different and that power control is absent, signals from those nodes may have different strengths. Therefore, it is necessary to be very careful with setting a threshold value for distinguishing whether or not data symbols of specific nodes are the same.

So far, it has been explained that the collision control scheme of the invention can be used for the BPSK and BPPM modulation methods, which are widely used in UWB communication systems. However, the collision control scheme of the invention can also be applied to other modulation methods, such as, Quadrature Amplitude Modulation (QAM), Frequency Shift Keying (FSK), etc.

Classification of Node Services

Figure 10:
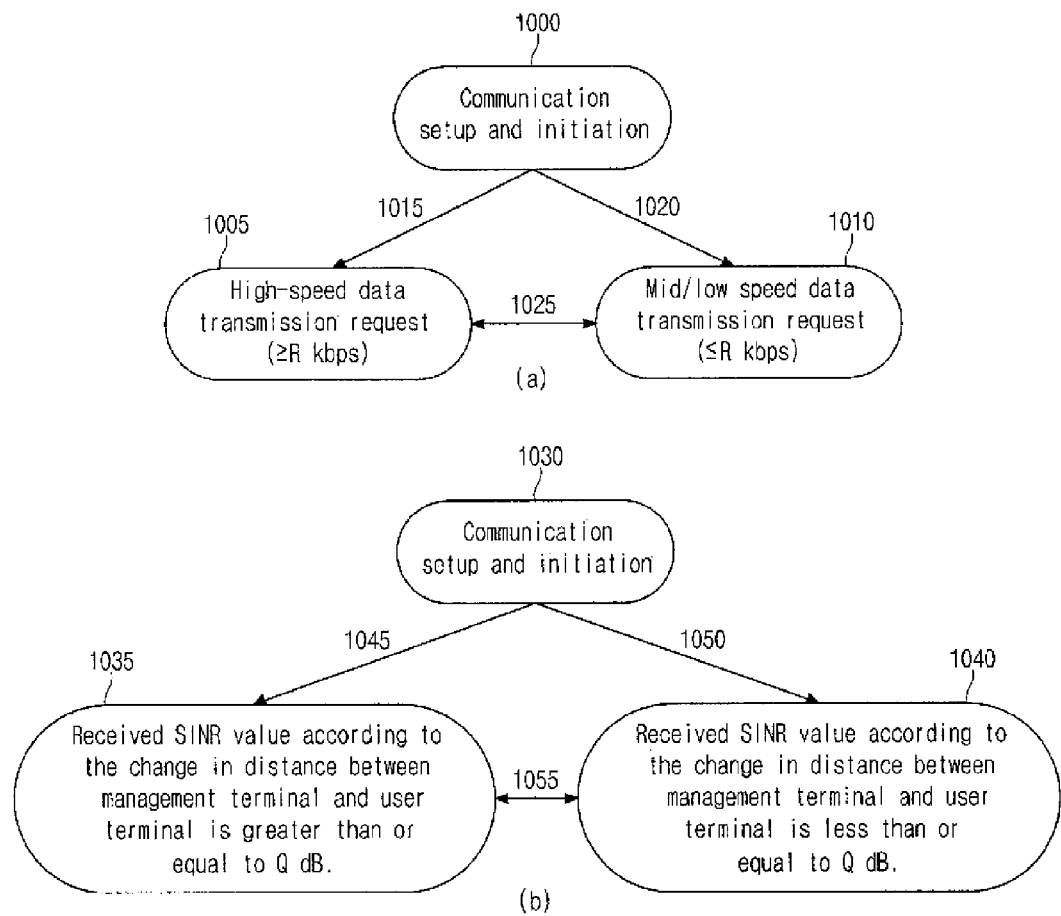
FIG. 10 is a conceptual diagram showing classification of node services when the communication according to one embodiment of the present invention is set up.

FIG. 10 shows the classification of node services when the communication according to one embodiment of the present invention is set up. First of all, in case a node in a system starts a mobile data communication service, communication is set up and initiated (1000). When a call or a session is set up for the first time, a management node classifies services requested by user nodes with respect to data transmission rates (1005 and 1010), and assigns one of time resource management methods (1015 and 1020) depending on the classified services. In detail, the management node informs the nodes about their assigned time resource management methods through a beacon period, and transmits information, e.g., orthogonal time hopping patterns, necessary for communications. One thing to be careful or be aware of is that requested transmission rates can be changed even during the communications and the time resource management methods can be changed accordingly (1025). Also, SINR values by distances between user nodes and the management node for the classification of services of user nodes can be taken into consideration. Once communication is set up and initiated (1030), the management node classifies the services requested by user nodes with respect to SINR values by distances between the management node and the user nodes (1035 and 1040). One of the time resource management methods is assigned (1045 and 1050) depending on the classified services and communication is accomplished. The time resource management methods can be changed correspondingly to the change in the SINR values caused by the change in distances between the management node and the user nodes (1055). The change in the time resource management methods is achieved per frame or per 'n' frames (n>1).

Frame Structure Suggestion

The frame structure suggested in the present invention is a mixed mode multiple access of OTHMA and OTDMA methods. By utilizing techniques like ranging for synchronization and attempting an access through hopping orthogonal time, OTHMA method takes advantage of the properties of orthogonal time resources to obtain statistical multiplexing properties. In OTDMA method, on the other hand, a management node schedules communication times of user nodes by using a beacon period and assigns a specific time to the user respective nodes.

Figure 11:
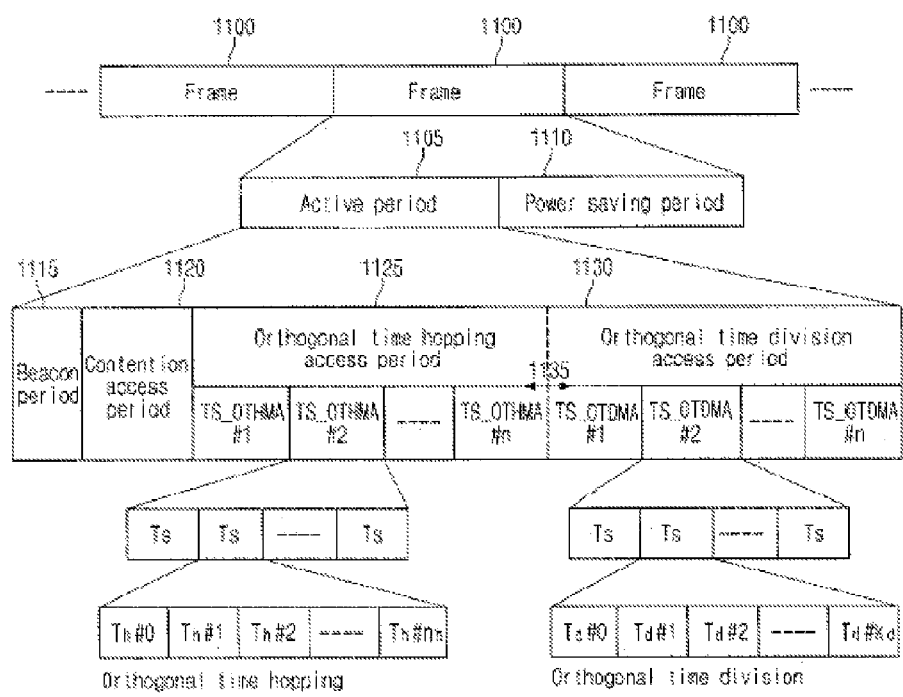
FIG. 11 shows a frame structure of a mixed mode multiple access method according to one embodiment of the present invention, in which the time resources are assigned flexibly without distinguishing between uplink and downlink periods.

FIG. 11 shows the structure of a frame 1100 used in the mixed mode multiple access method suggested in the present invention. After the services of the respective user nodes are classified into high-speed services and mid/low speed services as shown in FIG. 10, the data of each of the user nodes are mapped in the frame 1100 of FIG. 11. The frame 1100 is largely divided into an active period 1105 and a power saving period 1110. The active period 1105 is subdivided into a beacon period 1115, a contention access period 1120, an orthogonal time hopping access period 1125, and an orthogonal time division access period 1130. Particularly in the present invention, the power saving period 1110 is assigned to reduce the battery power consumption of user nodes. In the event that a user wants to use a mobile Internet service as well as a voice service, the power saving period 1110 may be removed or reduced for those services. In the contention access period 1120, the respective user nodes are joined in the communication, and communication setup and communication initiation and ranging are executed. Examples of protocol used in the contention access period include CSMA/CA scheme which is a contention-based multiple access, slotted ALOHA scheme, or multiple access scheme causing contention through predetermined patterns or time slots. As for communication setup in the absence of control information, the data of user nodes requesting mid/low speed services hop the time resources in the orthogonal time hopping access period 1125 according to the time hopping patterns given by using part of the beacon period 1115, and attempt communication. At this time, the time resources are assigned flexibly without distinguishing between upward and downward periods. Meanwhile, the data of user nodes requesting high-speed services are scheduled in the orthogonal time division access period 1130 and mapped later. The multiple access method of user nodes can be converted between the orthogonal time hopping 1125 and the scheduling-based orthogonal time division 1130. A dotted line 1135 in FIG. 11 distinguishes between the time resources used for attempting communication through time hopping and the time resources used for attempting communication through the scheduling-based orthogonal time division. A feature of the frame structure is that boundaries between the beacon period 1115, the contention access period 1120, the orthogonal time hopping access period 1125, and the orthogonal time division access period 1130 are variable for every frame. This may change according to the ratio of high-speed user nodes and mid/low speed user nodes described before. For instance, when the number of mid/low speed service users increases, the orthogonal time hopping access period 1125 increases and the amount of information in the beacon period 1115 is reduced. This is because the management node does not need to provide the mid/low speed service user nodes with scheduling relevant information about time resources available for the respective user nodes. When the amount of information in the beacon period 1115 is reduced, the efficiency of a frame is improved.

Figure 12:
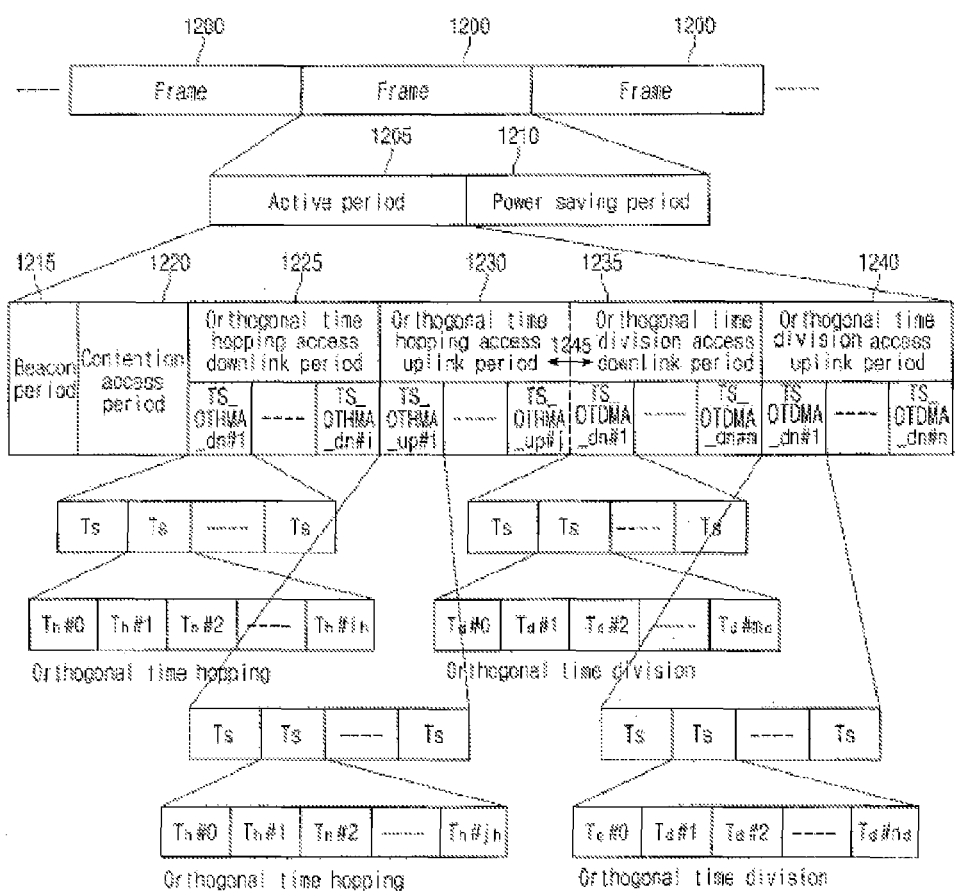
FIG. 12 shows a frame structure of a mixed mode multiple access method according to one embodiment of the present invention, in which the time resources are assigned by distinguishing between uplink and downlink periods.

FIG. 12 shows the structure of a frame 1200 for use in a mixed mode multiple access method suggested in the present invention. After the services of the respective user nodes are classified into high-speed services and mid/low speed services as shown in FIG. 10, data of each of the user nodes are mapped in the frame 1200 of FIG. 12. The frame 1200 is largely divided into an active period 1205 and a power saving period 1210. The active period 1205 is subdivided into a beacon period 1215, a contention access period 1220, an orthogonal time hopping access downward period 1225, an orthogonal time hopping access upward period 1230, an orthogonal time division access downlink period 1235, and an orthogonal time division access uplink period 1240. As for communication setup in the absence of control information, user nodes requesting mid/low rate services transmit their data using the time resources assigned by part of the beacon period 1215 in the orthogonal time hopping access uplink/downlink period 1230/1225. Meanwhile, the uplink and downlink data of user nodes requesting high-speed services are scheduled in the orthogonal time division access downlink period 1235 and in the orthogonal time division access uplink period 1240, respectively, and mapped later. A dotted line 1245 in FIG. 12 distinguishes between the time resources used for attempting communication through time hopping and the time resources used for attempting communication through the scheduling-based orthogonal time division, but this can be changed adaptively.

Figure 13:
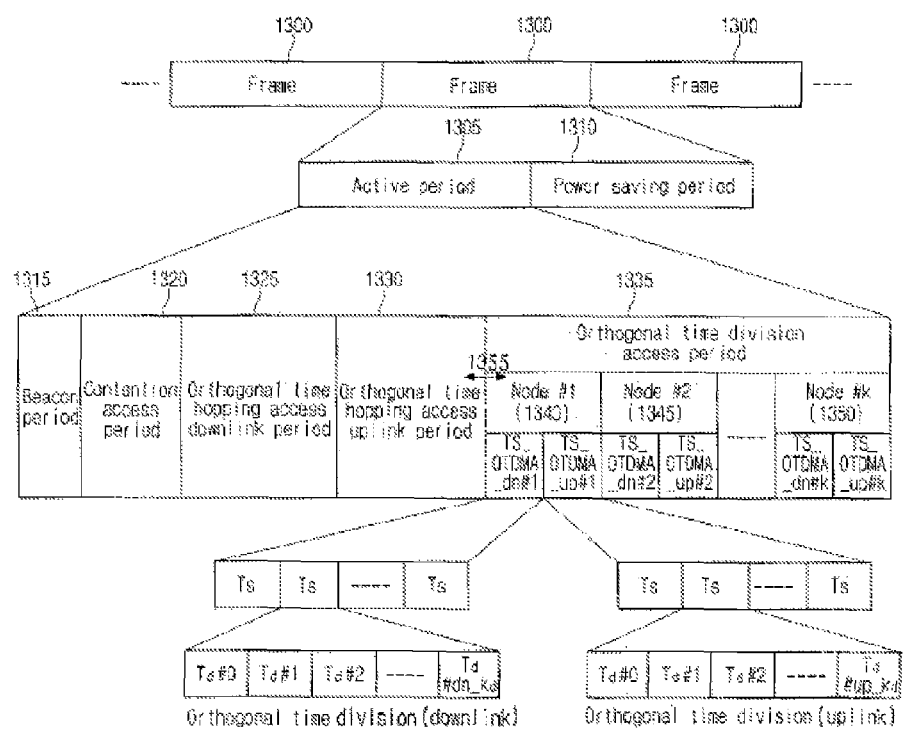
FIG. 13 shows a frame structure of a mixed mode multiple access method according to one embodiment of the present invention, in which the up- and down-link data are served all together to the respective users in an orthogonal time division access period.

FIG. 13 shows the structure of a frame 1300 for use in a mixed mode multiple access method suggested in the present invention. After the services of the respective user nodes are classified into high-speed services and mid/low speed services as shown in FIG. 10, the data of each of the user nodes are mapped in the frame 1300 of FIG. 13. The frame 1300 is largely divided into an active period 1305 and a power saving period 1310. The active period 1305 is subdivided into a beacon period 1315, a contention access period 1320, an orthogonal time hopping access downlink period 1325, an orthogonal time hopping access uplink period 1330, and an orthogonal time division access period 1335. As for communication setup in the absence of control information, the uplink and downlink data of user nodes requesting mid/low speed services hop time resources in the orthogonal time hopping access uplink period 1330 and in the orthogonal time hopping access downlink period 1325 according to the time hopping patterns given by using part of the beacon period 1315, and attempt communication. Meanwhile, the uplink and downlink data of user nodes requesting high-speed services attempt communication in the orthogonal time division access period 1335. At this time, to reduce the battery power consumption of a user node, uplink data and downlink data are served together to the respective users 1340, 1345 and 1350. A dotted line 1355 in FIG. 13 distinguishes between the time resources used for attempting communication through time hopping and the time resources used for attempting communication through the scheduling-based orthogonal time division, but this can be changed adaptively.

Hopping Pattern Management and Maintenance Scenario

An assignment cycle of time hopping patterns for use in an orthogonal time hopping access period in the mixed mode multiple access method of the present invention is as follows:

a) In case the assignment cycle of time hopping patterns coincides with a frame: Time hopping patterns for use in an orthogonal time hopping access can be generated per frame by using an ID number assigned to each frame and a user node's unique identifier. The time hopping patterns can also be assigned to users per frame by managing the time hopping patterns in a table.

b) In case the assignment cycle of time hopping patterns is in n-frame unit (n>1): The assignment cycle of time hopping patterns for use in an orthogonal time hopping access can be in n-frame unit (n>1) which is greater than a frame.

c) In case the assignment cycle of time hopping patterns covers communication setup of user nodes, initiation and end points of communication: Time hopping patterns for use in an orthogonal time hopping access are assigned at the point when a user node joins for the communication setup and initiation with a management node through a contention access period, and the assigned time hopping patterns are released when service(s) for the user node ends.

Since time hopping patterns are independent and are randomly generated for the respective user nodes, when different user node data are loaded at the same time, a collision of time hopping patterns may occur. Such collision can be properly controlled depending on an used modulation method.

The number of communicable time resources by hopping in an orthogonal time hopping access period can be changed since the length of the orthogonal time hopping access period varies by the number of mid/low speed service requesting user nodes among the total number of user nodes. Here, the shorter the assignment cycle of time hopping patterns, the greater the change in the number of time resources for hopping. Although this makes it possible to more efficiently manage time resources, complexity is increased that much. As the continuation of service time during communication increases, it is efficient to set the assignment cycle of time hopping patterns long. In case that the activity during the packet communication service is low or the transmission data rate is variable or the continuation of service time during communication is not long, it is efficient to set the assignment cycle of time hopping patterns short.

Method for informing whether there is data (Y/N) to be sent—using specific hopping pattern (uplink)

The present invention includes a communicating method in which a node that has information to be sent apart from specific time hopping patterns informs a management node of brief information about the presence of data to be sent by using a specific time hopping pattern. FIGS. 7 and 8 and FIG. 9 illustrated cases in which the management node is capable of and incapable of distinguishing information from nodes when the information occupied the same orthogonal time. It is important that the management node requires control information regarding whether all nodes attempted communication at a specific time or whether there is not a signal sent originally from the nodes. Of course, communication is possible without this control information. However, when there is no such control information, the management node must analyze and decode time hopping patterns of the respective nodes all the time. Therefore, in the present invention, when a node has information to be sent apart from specific time hopping patterns, the node sends data to the management node and provides a brief information about the presence of data to be sent by using a specific time hopping pattern. When it is necessary to constitute such hopping pattern, every node should have a unique and non-collidable hopping pattern. This is because when the hopping pattern loaded with control information is collided and thus, transmitted uncertainly because of that, the system may operate unstably. Although a control signal may be generated through this procedure, the method is still advantageous for the management node in that complexity for decoding all the time hopping patterns for each receiving instant is substantially reduced.

Method for informing whether there is data (Y/N) to be sent—using user ID information in beacon period (downlink)

According to a frame structure suggested in the present invention, as for a downlink in the orthogonal time hopping multiple access method, the management node is capable of informing user nodes whether there is information to be sent by using user ID in the beacon period. In detail, user ID for which information needs to be sent is included in the beacon information. Similarly, as for a downlink in the orthogonal time division multiple access method, the management node is capable of informing user nodes whether there is information to be sent by using user ID in the beacon period. That is, user ID for which information needs to be sent is included in the beacon information. Here, user ID is assigned and announced from the management node to a user node when it joins in communication with the management node, desiring to set up and initiate communication through the contention access period.

Method for informing whether there is data (Y/N) to be sent—using bitmap information in beacon period (downlink)

According to a frame structure suggested in the present invention, as for a downlink in the orthogonal time hopping multiple access method, the management node is capable of informing user nodes whether there is information to be sent by using 1-bit information for each user in the beacon period. In detail, a bitmap is built using 1-bit information for a user and included in the beacon information. Similarly, as for a downlink in the orthogonal time division multiple access method, the management node is capable of informing user nodes whether there is information to be sent by using 1-bit information for each user in the beacon period. That is, a bitmap is built using 1-bit information for a user and included in the beacon information. Mapping between each of the user nodes and each bit in the bitmap information of the beacon period can use a method that the management node informs the user nodes of the position of an assigned bit in the bitmap when the user node joins in communication with the management node, desiring to set up and initiate communication through the contention access period.

Method for Informing Whether There is Data (Y/N) to be Sent—Using Energy Level (Uplink)

According to this method, the management node, more specifically, a receiving end of the management node, inherently knows, without any control information, whether or not there have been user node information for the respective user nodes, or whether there has been an error when such information existed, by detecting information indicating whether a specific user node transmitted data through an energy level of the data transmitted from the user node. First of all, a receiver of the management node demodulates with regard to the respective user nodes since it does not know whether user nodes attempting communication through time hopping have transmitted data. Following the demodulation, the management node checks the energy levels of data that were classified and demodulated for the respective user nodes. When there are certain data that were not actually transmitted, the data would not exceed a specific reference value. By this checking process, the management node may not perform a complex processes like decoding, collision control, etc. on user nodes that have not actually transmitted information. User nodes with energy levels exceeding the specific energy reference value are assumed to have transmitted information to the management node and therefore, collision check and collision control are performed on them. At this time, collision control may or may not be achieved, depending on the modulation methods being used. After decoding for the respective user nodes, the management node finds out whether there is an error in the received data through a CRC check. Even if the data reception structure seems to be complex, the method is advantageous in that user nodes do not need to send control information telling the existence of information.

Grouped Frame Structure I

In case that the number of user nodes in a network increases and many of the user nodes attempt communication, the user nodes are classified into more than one group and a mixed mode of the orthogonal time division and the orthogonal time hopping is used for the respective groups for efficient management with a simple method.

Figure 14:
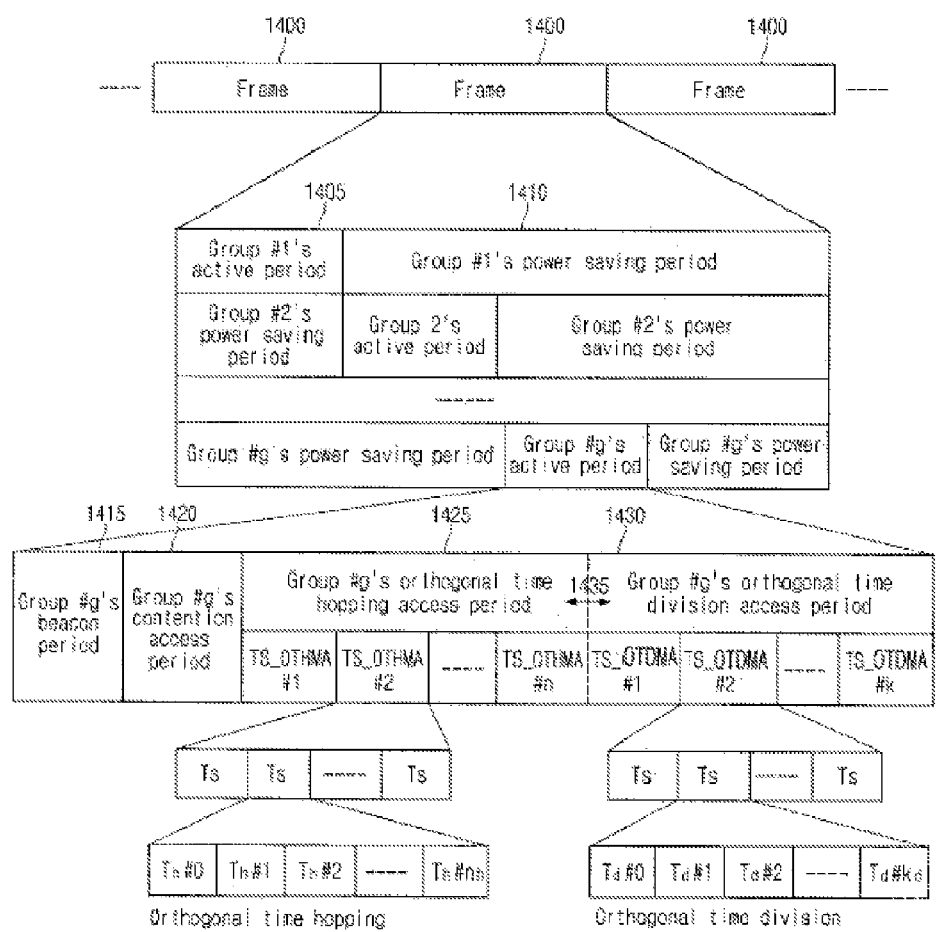
FIG. 14 shows a frame structure of a mixed mode multiple access method for groups according to one embodiment of the present invention, in which the user nodes are classified into at least one group and the time resources are assigned flexibly to the respective groups without distinguishing between uplink and downlink periods.

FIG. 14 shows the structure of a frame 1400 for use in a mixed mode multiple access method for groups suggested in the present invention. After the services of the respective user nodes are classified into high-speed services and mid/low speed services as shown in FIG. 10, the data of each of the user nodes are mapped in the frame 1400 of FIG. 14. The frame 1400 in each group is largely divided into an active period 1405 and a power saving period 1410. The active period 1405 in each group is subdivided into a beacon period 1415, a contention access period 1420, an orthogonal time hopping access period 1425, and an orthogonal time division access period 1430. A feature of this frame structure is that the active periods of the respective groups are set not to be overlapped with one another. This can be interpreted with TDMA scheme in which each group is given an access time to the management node. Therefore, nodes do not lead to any collisions with other nodes in different groups within a radio network even if the nodes are managed by the same management node. When there is no such group, nodes under the same management node may easily collide with one another since they attempt to transmit data frames that were generated in an inactive period in an active period of the same frame. In the contention access period 1420, the respective user nodes in each group are joined in the communication, and communication setup, communication initiation and ranging are executed. As for communication setup in the absence of control information, the data of user nodes requesting mid/low speed services hop the time resources by groups in the orthogonal time hopping access period according to the time hopping patterns given by using part of the beacon period 1415, and attempt communication. At this time, the time resources are assigned flexibly without distinguishing between uplink and downlink periods. Meanwhile, the data of user nodes requesting high-speed services are scheduled by groups in the orthogonal time division access period 1430 and are mapped later. A dotted line 1435 in FIG. 14 distinguishes between the time resources used for attempting communication through time hopping and the time resources used for attempting communication through the scheduling-based orthogonal time division, but this can be changed adaptively.

Figure 15:
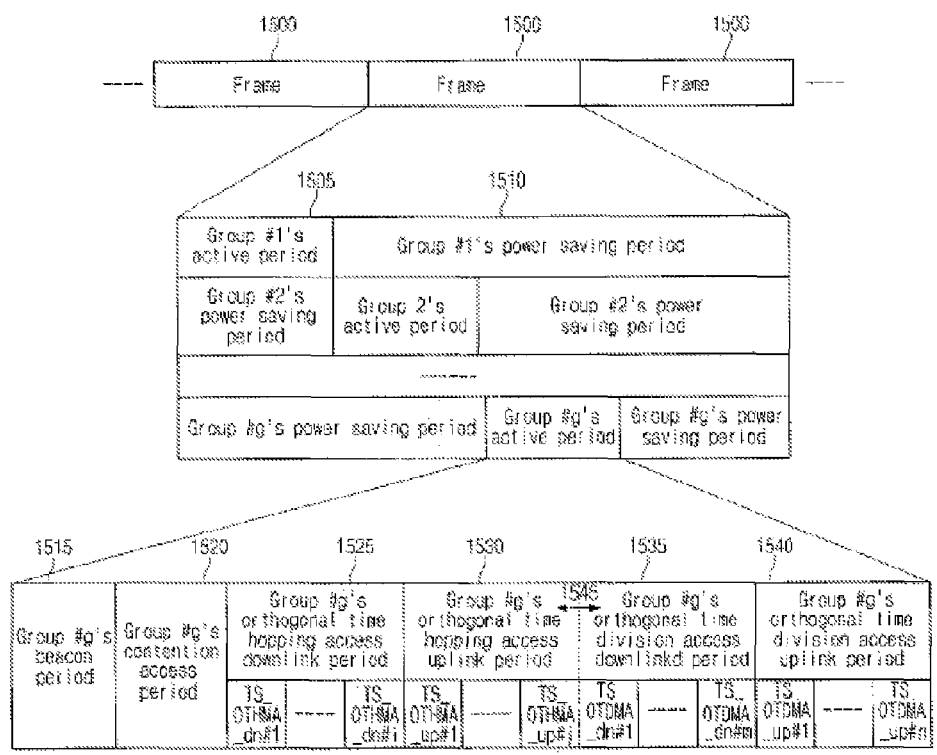
FIG. 15 shows a frame structure of a mixed mode multiple access method for groups according to one embodiment of the present invention, in which the user nodes are classified into at least one group and the time resources are assigned to the respective groups by distinguishing between upward and downward periods.

FIG. 15 shows the structure of a frame 1500 for use in a mixed mode multiple access method for groups suggested in the present invention. After the services of the respective user nodes are classified into high-speed services and mid/low speed services as shown in FIG. 10, the data of each of the user nodes are mapped in the frame 1500 of FIG. 15. The frame in each group is largely divided into an active period 1505 and a power saving period 1510. The active period 1505 in each group is subdivided into a beacon period 1515, a contention access period 1520, an orthogonal time hopping access downward period 1525, an orthogonal time hopping access uplink period 1530, an orthogonal time division access downlink period 1535, and an orthogonal time division access uplink period 1540. As for communication setup in the absence of control information, the uplink and downlink data of user nodes requesting mid/low speed services hop time resources by groups in the orthogonal time hopping access uplink period 1530 and in the orthogonal time hopping access downlink period 1525 according to the time hopping patterns given by using part of the beacon period, and attempt communication. Meanwhile, the uplink and downlink data of user nodes requesting high-speed services are scheduled by groups in the orthogonal time division access downlink period 1535 and in the orthogonal time division access uplink period 1540, respectively, and are mapped later. A dotted line 1545 in FIG. 15 distinguishes between the time resources used for attempting communication through time hopping and the time resources used for attempting communication through the scheduling-based orthogonal time division, but this can be changed adaptively.

Figure 16:
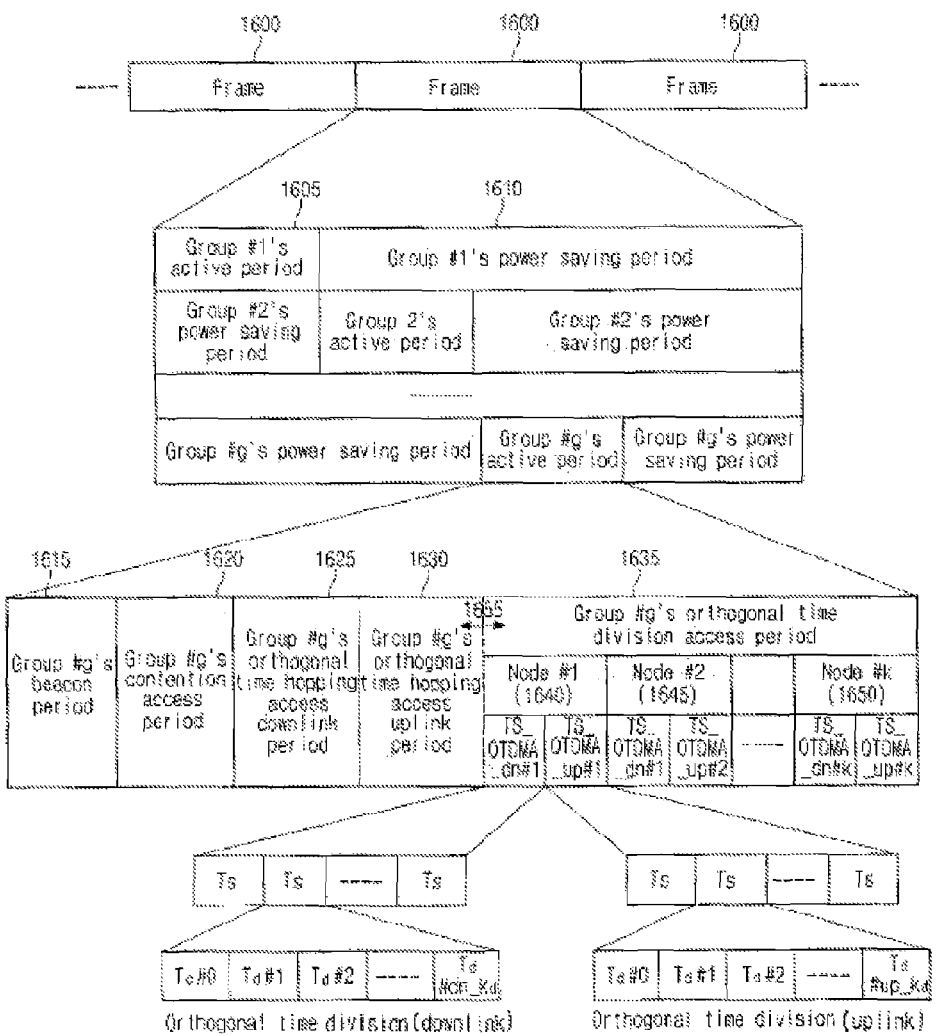
FIG. 16 shows a frame structure of a mixed mode multiple access method for groups according to one embodiment of the present invention, in which up- and down-link data are served all together to the respective users in an orthogonal time division access period.

FIG. 16 shows the structure of a frame 1600 for use in a mixed mode multiple access method for groups suggested in the present invention. After the services of the respective user nodes are classified into high-speed services and mid/low speed services as shown in FIG. 10, the data of each of the user nodes are mapped in the frame 1600 of FIG. 16. The frame 1600 in each group is largely divided into an active period 1605 and a power saving period 1610. The active period 1605 is subdivided into a beacon period 1615, a contention access period 1620, an orthogonal time hopping access downlink period 1625, an orthogonal time hopping access uplink period 1630, and an orthogonal time division access period 1635. As for communication setup in the absence of control information, the uplink and downlink data of user nodes requesting mid/low speed services hop time resources by groups in the orthogonal time hopping access uplink period 1630 and in the orthogonal time hopping access downlink period 1625 according to the time hopping patterns given by using part of the beacon period, and attempt communication. Meanwhile, the uplink and downlink data of user nodes requesting high-speed services attempt communication by groups in the orthogonal time division access period 1635. At this time, to reduce battery power consumption of a user node, uplink data and downlink data are served together to the respective users 1640, 1645 and 1650. A dotted line 1655 in FIG. 16 distinguishes between the time resources used for attempting communication through time hopping and the time resources used for attempting communication through the scheduling-based orthogonal time division, but this can be changed adaptively.

Grouped Frame Structure II

In case that the number of user nodes in a network increases and many of the user nodes attempt communication, the user nodes are classified into more than one group and the orthogonal time hopping is used for the respective groups while the orthogonal time division is used for the entire group. When the orthogonal time division is used for the entire group, not for the respective groups, one-time scheduling is sufficient. That is, scheduling does not need to be done on each frame in the respective groups. Especially, in case of broadcast information like broadcast services, the information can be transmitted at once, instead of transmitting as many times as the number of groups.

Figure 17:
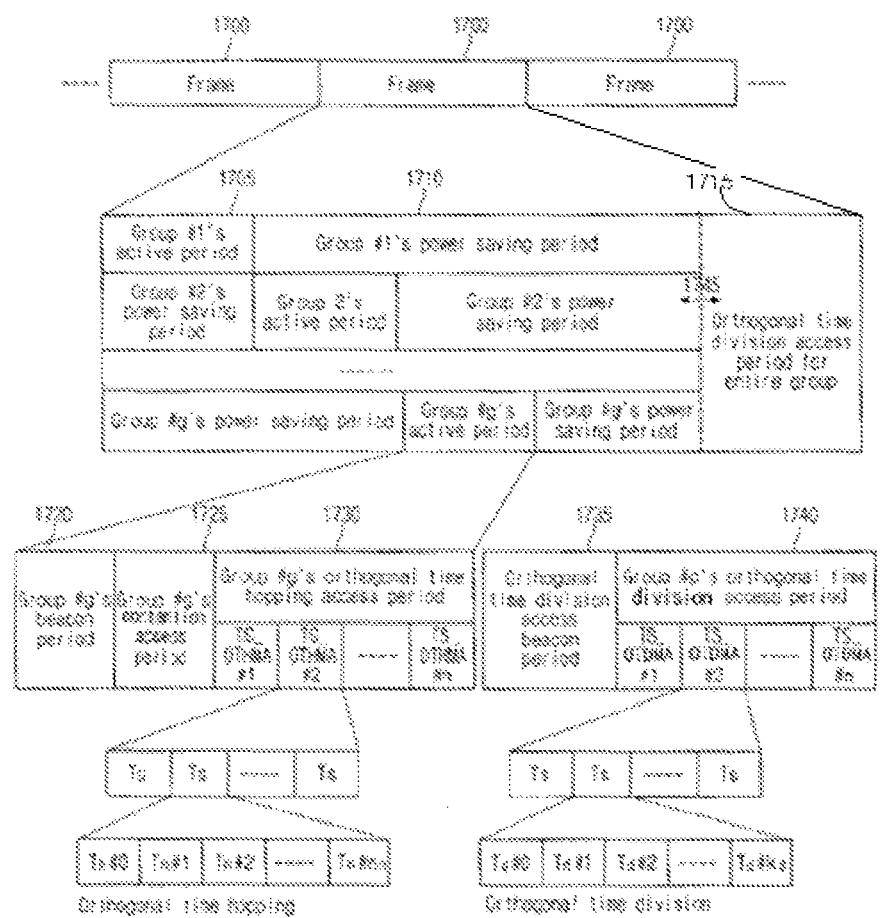
FIG. 17 shows a frame structure of a mixed mode multiple access method for groups according to one embodiment of the present invention, in which the time resources are assigned flexibly without distinguishing the uplink and downlink periods, given that the orthogonal time hopping method is applied to the respective groups, while the orthogonal time division method is applied to the entire group.

FIG. 17 shows the structure of a frame 1700 for use in a mixed mode multiple access method for groups suggested in the present invention. After services of the respective user nodes are classified into high-speed services and mid/low speed services as shown in FIG. 10, the data of each of the user nodes are mapped in the frame 1700 of FIG. 17. The frame 1700 is largely divided into an active period 1705 and a power saving period 1710 by groups, and an orthogonal time division access period 1715 for the entire group. The active period 1705 in each group is subdivided into a beacon period 1720, a contention access period 1725, and an orthogonal time hopping access period 1730. The orthogonal time division access period 1715 for the entire group is subdivided into an orthogonal time division access beacon period 1735 and an orthogonal time division access period 1740. In the contention access period 1725, the respective user nodes in each group are joined in the communication, communication setup and communication initiation and ranging are executed. As for communication setup in the absence of control information, the data of user nodes requesting mid/low speed services hop time resources by groups in the orthogonal time hopping access period 1730 according to the time hopping patterns given by using part of the beacon period 1720, and attempt communication. Meanwhile, the data of user nodes requesting high-speed services are scheduled in the orthogonal time division access period 1715 for the entire group and are mapped later. At this time, the time resources are assigned flexibly without distinguishing between uplink and downlink periods. A dotted line 1745 in FIG. 17 distinguishes between the time resources used for attempting communication through time hopping and the time resources used for attempting communication through the scheduling-based orthogonal time division, but this can be changed adaptively.

Figure 18:
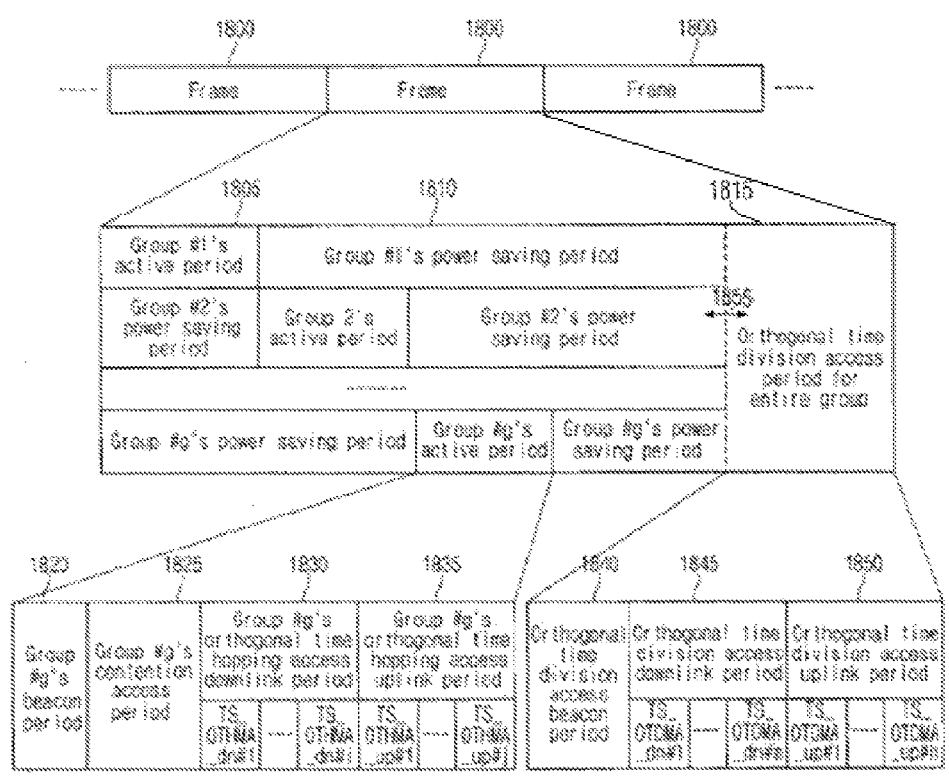
FIG. 18 shows a frame structure of a mixed mode multiple access method for groups according to one embodiment of the present invention, in which the time resources are assigned by distinguishing the uplink and downlink periods, given that the orthogonal time hopping method is applied to the respective groups, while the orthogonal time division method is applied to the entire group.

FIG. 18 shows the structure of a frame 1800 for use in a mixed mode multiple access method for groups suggested in the present invention. After the services of the respective user nodes are classified into high-speed services and mid/low speed services as shown in FIG. 10, the data of each of the user nodes are mapped in the frame 1800 of FIG. 18. The frame 1800 is largely divided into an active period 1805 and a power saving period 1810 by groups, and an orthogonal time division access period 1815 for the entire group. The active period 1805 in each group is subdivided into a beacon period 1820, a contention access period 1825, an orthogonal time hopping access downlink period 1830, and an orthogonal time hopping access uplink period 1835. As for communication setup in the absence of control information, the uplink and downlink data of user nodes requesting mid/low speed services hop time resources by groups in the orthogonal time hopping access uplink period 1835 and in the orthogonal time hopping access downlink period 1830 according to the time hopping patterns given by using part of the beacon period 1820, and attempt communication. Meanwhile, the orthogonal time division access period 1815 for the entire group is subdivided into an orthogonal time division access beacon period 1840, an orthogonal time division access downlink period 1845, and an orthogonal time division access uplink period 1850. The uplink and downlink data of user nodes requesting high-speed services are scheduled in the orthogonal time division access downlink period 1845 and in the orthogonal time division access uplink period 1850 for the entire group, and are mapped later. A dotted line 1855 in FIG. 18 distinguishes between the time resources used for attempting communication through time hopping and the time resources used for attempting communication through the scheduling-based orthogonal time division, but this can be changed adaptively.

Figure 19:
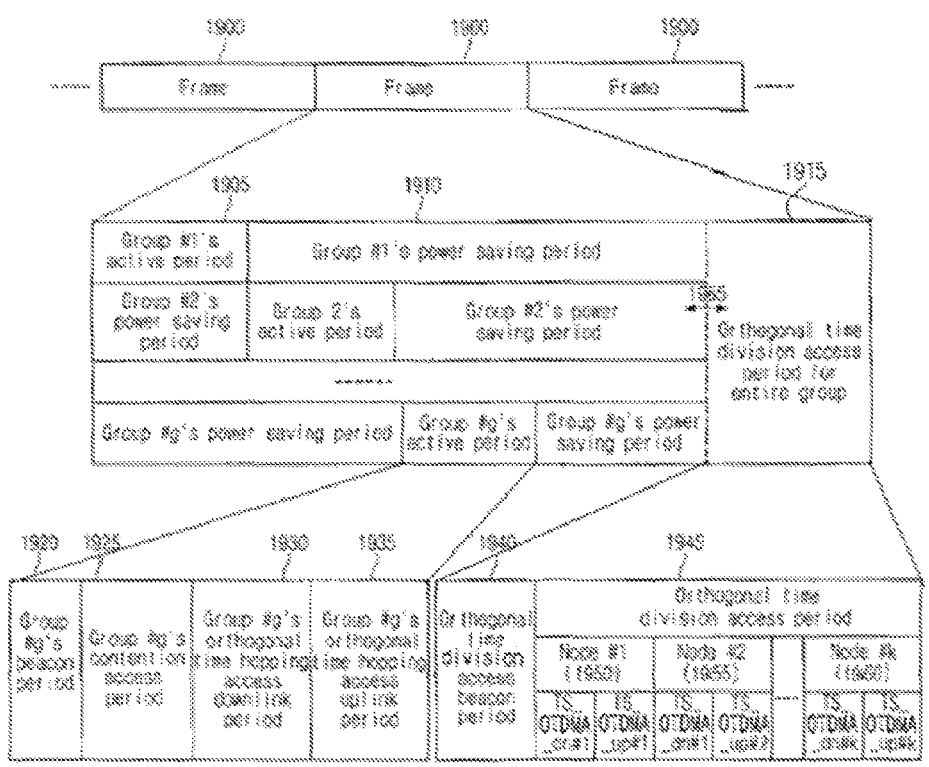
FIG. 19 shows a frame structure of a mixed mode multiple access method for groups according to one embodiment of the present invention, in which the up- and down-link data are served all together to the respective users, given that the orthogonal time hopping method is applied to the respective groups, while the orthogonal time division method is applied to the entire group.

FIG. 19 shows the structure of a frame 1900 for use in a mixed mode multiple access method for groups suggested in the present invention. After the services of the respective user nodes are classified into high-speed services and mid/low speed services as shown in FIG. 10, the data of each of the user nodes are mapped in the frame 1900 of FIG. 19. The frame 1900 is largely divided into an active period 1905 and a power saving period 1610 for the respective groups, and an orthogonal time division access period 1915 for the entire group. The active period 1905 is subdivided into a beacon period 1920, a contention access period 1925, an orthogonal time hopping access downlink period 1930, and an orthogonal time hopping access uplink period 1935. As for communication setup in the absence of control information, the uplink and downlink data of user nodes requesting mid/low speed services hop time resources by groups in the orthogonal time hopping access uplink period 1935 and in the orthogonal time hopping access downlink period 1930 according to the time hopping patterns given by using part of the beacon period 1920, and attempt communication. Meanwhile, the uplink and downlink data of user nodes requesting high-speed services attempt communication by groups in the orthogonal time hopping access upward period 1935 and in the orthogonal time hopping access downward period 1930. Meanwhile, the orthogonal time division access period 1915 for the entire group is subdivided into an orthogonal time division access beacon period 1940 and an orthogonal time division access period 1945. The uplink and downlink data of user nodes requesting high-speed services attempt communication in the orthogonal time division access period 1945 for the entire group. At this time, to reduce the battery power consumption of a user node, uplink data and downlink data are served together to the respective users 1950, 1955 and 1960. A dotted line 1965 in FIG. 19 distinguishes between the time resources used for attempting communication through time hopping and the time resources used for attempting communication through the scheduling-based orthogonal time division, but this can be changed adaptively.

Group Classification Method

In case that the number of user nodes in a network increases and many of the user nodes attempt communication, the user nodes are classified into more than one group for efficient management with a simple method. In detail, user nodes are classified into different groups according to:

a) Data transmission rate requested by a user;
   b) Distance between user node and management node;
   c) SINR value in user node or in management node; and
   d) User node's ID number.

After classifying user nodes into more than one group, those user nodes can be further classified again periodically or whenever necessary. In detail, user nodes are reclassified as follows:

a) Reclassifying user node groups per frame;
   b) Reclassifying user node groups in 'n' frame (n>1) unit; and
   c) Reclassifying user node groups every time a user node joins with the management node for communication setup and initiation through a contention access period.

Method for Performance Improvement of Contention Access Period

Figure 20:
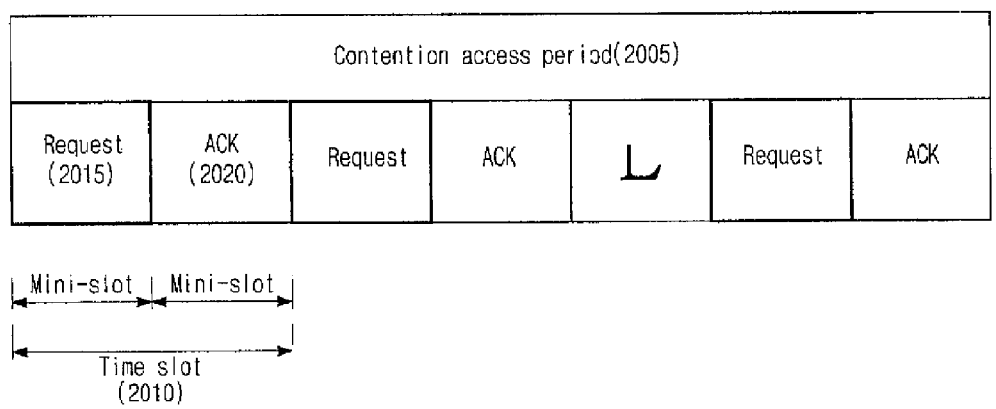
FIG. 20 is a diagram illustrating a communication set-up process for plural nodes through a distributed contention period mode in case those plural nodes simultaneously request a communication setup to a management node, in accordance with one embodiment of the present invention.

FIG. 20 illustrates a communication set-up process for plural nodes through a distributed from station mode in case those plural nodes simultaneously request a communication setup of a management node, in accordance with one embodiment of the present invention.

When a network is initialized and the management node requests communication setup of the respective nodes or data transmission is performed after the data about specific events of the respective nodes are first collected, i.e., a large number of nodes set up communication with the management node at the same time, many nodes can access the medium on a contention access period 2005. In this case, the performance of the CSMA/CA is substantially deteriorated. To resolve this problem, the contention access period is divided into time slots 2010 with a proper size, and each slot is subdivided into uplink mini-slots 2015 for requesting communication setup and downlink mini-slots 2020 for giving ACK. When one of the uplink mini-slots with a proper size is randomly selected by each of the nodes and the data from the nodes are transmitted to the management node without causing any collisions, an ACK signal is immediately given to the node through a next downlink mini-slot. Through this distributed access structure, communication setup can be done more efficiently although many nodes may request communication setups at the same time. Through this procedure, the respective nodes determine the type of communication according to their requested services, and are given unique hopping patterns accordingly.

While the invention is susceptible to various modifications and alternative forms, specific embodiments have been shown by way of example in the drawings and described in detail herein. However, it should be understood that the invention is not limited to the particular forms disclosed. Rather, the invention covers all modifications, equivalents, and alternatives falling within the spirit and scope of the invention as defined in the appended claims.

INDUSTRIAL APPLICABILITY

As described above, the multiple access digital communicating method according to the embodiment of the present invention can be used in an ultra-band communication system.

What is claimed is:

1. A digital communication method between user nodes and a management node, comprising:
   allocating access resources to the user nodes to allow the user nodes to attempt multiple accesses by a scheduling based orthogonal time division method or by an orthogonal time hopping method, according to data transmission rates of services requested by the respective user nodes;
   receiving a first signal transmitted according to the scheduling based orthogonal time division method during an orthogonal time division access period;
   receiving a second signal transmitted according to the orthogonal time hopping method during an orthogonal time hopping access period that is not overlapped with the orthogonal time division access period; and
   classifying, by the management node, the user nodes into at least one group, and attempting communication by groups in a mixed mode of the orthogonal time division method and the orthogonal time hopping method.

2. The method of claim 1, wherein a power saving period is assigned in consideration of battery power consumption of the respective user nodes, and the mixed mode of the orthogonal time hopping method and the orthogonal time division method is used in an active period which is not the power saving period.

3. The method of claim 1, wherein the user nodes requesting high-speed data services accommodate a scheduling based multiple access, while the user nodes requesting mid/low speed data services accommodate the orthogonal time hopping method.

4. The method of claim 1, wherein reciprocal conversion of the multiple access methods is possible during communication.

5. The method of claim 1, further comprising one of the following:
   assigning time resources flexibly without distinguishing between uplink and downlink periods;
   distinguishing between uplink and downlink periods, scheduling and mapping uplink and downlink data of a user node in orthogonal time division access uplink and downlink periods, and hopping time resources in orthogonal time hopping access uplink and downlink periods for communication; and
   serving the uplink and downlink data by users in the orthogonal time division access period and thereby, reducing battery power consumption of the respective user nodes.

6. The method of claim 1, wherein the user nodes are classified into at least one group, and the orthogonal time hopping access method is used for the respective groups while the orthogonal time division method is used for the entire group.

7. The method of claim 1, wherein the classification of the user nodes into at least one group is determined by one of the following conditions:
   data transmission rates requested by users;
   distances between the respective user nodes and the management node;
   received Signal to Interference and Noise Ratio (SINR) values in the respective user nodes or the management node; and
   user node ID numbers.

8. The method of claim 1, wherein after the user nodes are classified into at least one group, the user node groups are reclassified periodically or if necessary.

9. The method of claim 8, further comprising one of the following:
   reclassifying user node groups per frame;
   reclassifying user nodes groups in 'n' frame unit (n>1); and
   reclassifying user node groups every time a user node joins with the management node through a contention access period for communication setup and communication initiation.

10. The method of claim 1, wherein time hopping patterns in the orthogonal time hopping multiple access method are managed by one of the following methods:
    generating a time hopping pattern per frame by using an intrinsic ID assigned to each frame and an intrinsic identifier assigned to a user node;
    assigning the time hopping patterns to users per frame by managing time hopping patterns in the orthogonal time hopping multiple access method in a table;
    assigning the time hopping patterns in the orthogonal time hopping multiple access method in 'n' frame unit (n>1); and
    assigning the time hopping patterns in the orthogonal time hopping multiple access method at a point when a user node joins with the management node through a contention access period for communication setup and communication initiation, and restoring the assigned time hopping patterns when service(s) of the user node ends.

11. The method of claim 1, wherein a node with information to be sent apart from specific time hopping patterns in the orthogonal time hopping multiple access method provides the management node with the data and a brief information about the presence of the data by using a specific time hopping pattern.

12. The method of claim 1, wherein the management node does not define a control signal channel regarding whether the respective user nodes have information to be sent for a downlink in the orthogonal time hopping multiple access method, but builds a bitmap of 1 bit information by users using the bitmap information in a beacon period and includes the bitmap in beacon information to inform the users.

13. The method of claim 1, wherein the management node does not define a control signal channel regarding whether the respective user nodes have information to be sent for a downlink in the orthogonal time division multiple access method, but builds a bitmap of 1 bit information by users using the bitmap information in a beacon period and includes the bitmap in beacon information to inform the users.

14. The method of claim 1, wherein a control signal channel indicating whether the respective nodes have information to be sent is not defined, but a received energy level of the management node is used to check whether data of the respective nodes exist in a frame.

15. The method of claim 1, wherein the management node does not define a control signal channel regarding whether the respective user nodes have information to be sent for a downlink in the orthogonal time hopping multiple access method, but includes only a user ID with information to be sent using the user ID in the beacon period to inform the users.

16. The method of claim 1, wherein the management node does not define a control signal channel regarding whether the respective user nodes have information to be sent for a downlink in the orthogonal time division multiple access method, but includes only a user ID with information to be sent using the user ID in the beacon period to inform the users.

* * * * *